United States Patent [19]

McGregor

[11] 4,134,949
[45] Jan. 16, 1979

[54] METHOD TO FORM A BELL END IN A PLASTIC PIPE

[75] Inventor: Jimmie R. McGregor, Mineral Wells, Tex.

[73] Assignee: Harsco Corporation, Camp Hill, Pa.

[21] Appl. No.: 769,736

[22] Filed: Feb. 17, 1977

[51] Int. Cl.² ............................................. B29D 23/00
[52] U.S. Cl. .................................... 264/519; 264/296; 264/571; 264/322; 264/334; 425/388; 425/DIG. 218
[58] Field of Search .................. 264/90, 92, 320, 322, 264/296, 334; 425/388, DIG. 218

[56] References Cited

U.S. PATENT DOCUMENTS

| 3,728,065 | 4/1973 | Figwer | 425/392 |
|---|---|---|---|
| 3,729,282 | 4/1973 | Herter | 425/393 |
| 3,749,543 | 7/1973 | Stansbury | 425/393 |
| 3,776,682 | 12/1973 | Parmann | 425/388 X |
| 3,853,450 | 12/1974 | Acda | 425/393 |
| 3,942,935 | 3/1976 | Heisler | 264/322 X |

*Primary Examiner*—Thomas P. Pavelko

*Attorney, Agent, or Firm*—Cameron, Kerkam, Sutton, Stowell & Stowell

[57] ABSTRACT

A method for forming a heated end of a plastic pipe into a bell having a sealing groove therein arranged to receive a seal so that it may be sealingly joined with a plain end of a second pipe inserted therein. The apparatus comprises a mandrel base rigidly secured to a mandrel core having annular grooves formed thereabout communicating with a vacuum source through a passage formed in the core and base. A mandrel shell comprising four separable segments is secured on the core. The mandrel shell has a plurality of apertures formed therein communicating with the annular groove on the core such that a vacuum may be drawn through the apertures. A heated plastic pipe is forced over the mandrel shell until it engages a tapered shoulder formed on the mandrel base, thus forming a seal between the end of the pipe and the base. A vacuum is drawn on the cavity formed between the plastic pipe and the mandrel shell thus drawing the plastic pipe to the shell, forming an annular internal groove in the pipe. Segments of the mandrel shell are removed from the end of the pipe after withdrawing the mandrel core therefrom.

3 Claims, 7 Drawing Figures

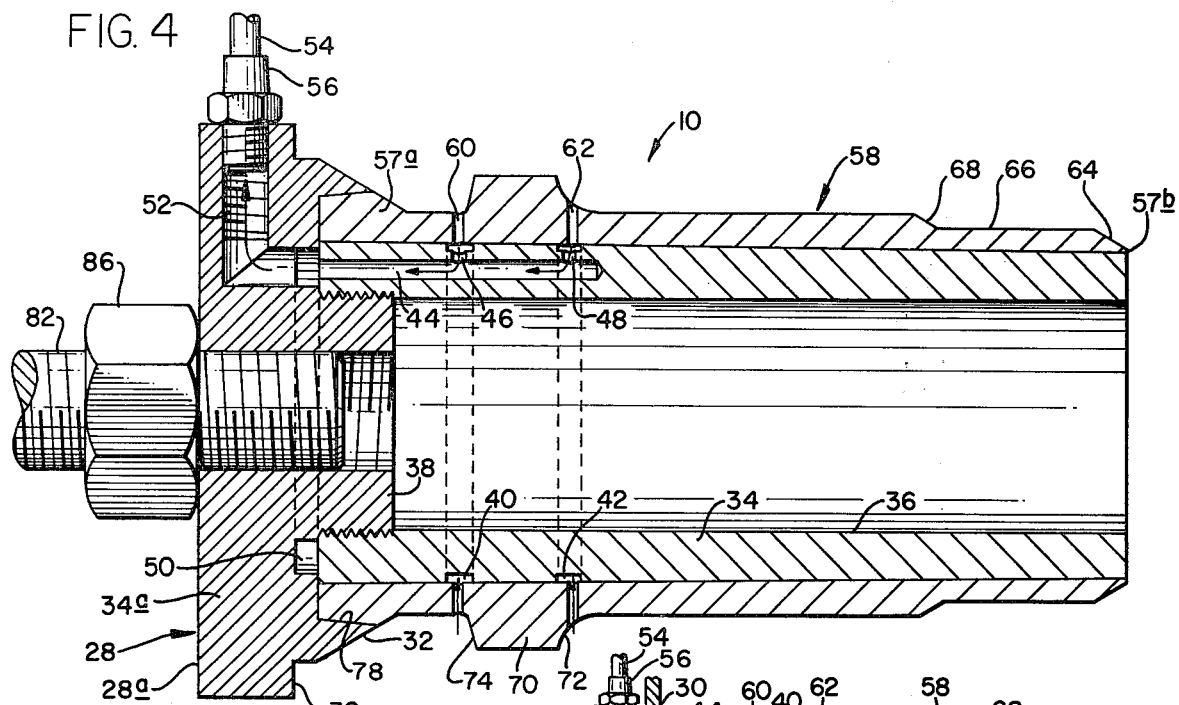
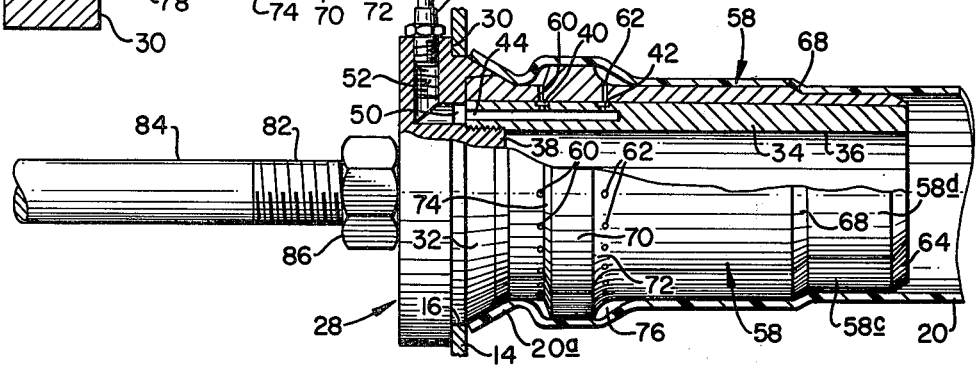
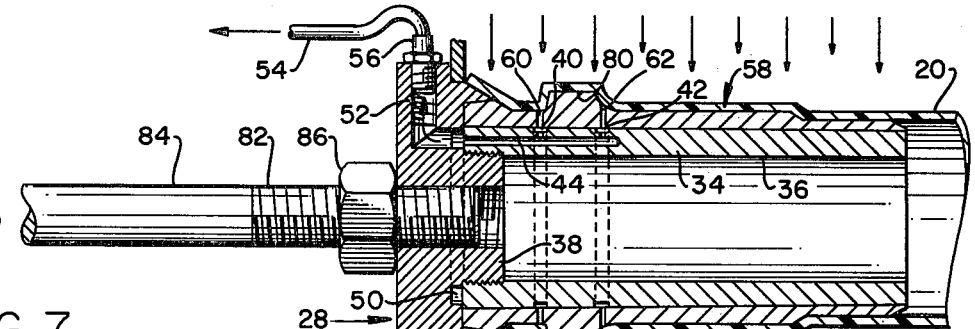
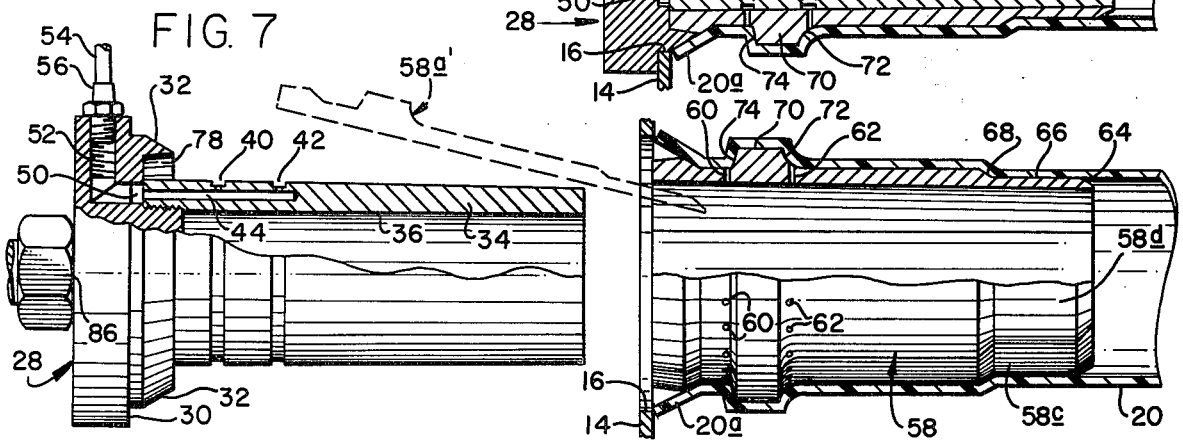

METHOD TO FORM A BELL END IN A PLASTIC PIPE

BACKGROUND

A plastic pipe is formed in straight tubular forms of various sizes. In order to join the plastic pipe without the necessity of having a special outside coupling, it is necessary to form a bell in the end of the pipe such that it will receive the plain end of an adjoining pipe. The bell is formed by expanding the pipe outwardly such that the inside diameter of the bell is equal to the outside diameter of the pipe. In order to seal about the end of the pipe, a resilient O-ring is usually secured in a groove formed in the interior wall of the bell.

Heretofore, devices for forming the end of the pipe have been of the type which positions a retractable mandrel into the pipe and expands the mandrel outwardly by a screw or other similar device, thus pushing the pipe into a exterior mold cavity which is clamped about the end of the pipe. This is a cumbersome process which requires extensive molding equipment having many moving parts which wear out.

SUMMARY

I have devised a method for forming the bell end of a plastic pipe by utilizing a four segment mandrel shell which is positioned over a mandrel core held in place by a mandrel base. The mandrel core has an annular groove formed about its periphery which communicates with a plurality of apertures formed in the mandrel shell at a first end. A passage formed in the mandrel core and base connects the apertures and groove to a vacuum source.

The plastic pipes are heated to a predetermined temperature to soften the plastic while they are positioned on a rack. The end of the heated pipe is aligned with the mandrel such that the pipe can be pushed over the mandrel. As the plastic pipe is pushed over the mandrel shell, it engages the first expanding shoulder to expand the pipe outwardly such that the inside diameter of the pipe bell is equal to the outside diameter of the pipe. The plastic pipe is further pushed over the annular expanding shoulder and engages a tapered shoulder on the mandrel base, deflecting the end of the pipe outwardly. The deflected end forms a seal with the tapered shoulder of the base and a seal is formed with the first shoulder which expands the pipe. Thus, a cavity is formed about the annular expanding shoulder wherein a vacuum is drawn through the apertures formed in the mandrel shell and mandrel core such that the softened plastic is drawn tightly over the mandrel shell, forming the annular groove about the interior of the bell end of the pipe for receiving a seal therein.

The end of the pipe is cooled by spraying cool water or other liquid onto the exterior of the pipe. After a predetermined time, a hydraulic cylinder or other means is actuated to withdraw the mandrel core from the pipe, leaving the mandrel shell inside the end of the pipe. To further facilitate the removal of the mandrel core from the mandrel shell a stripper plate is secured about the mandrel base which remains stationary such that as the mandrel base is withdrawn from an aperture formed in the stripper plate, the end of the pipe abutts the plate, limiting longitudinal movement of the pipe.

After the mandrel core has been withdrawn the four segmented pieces of the shell remain inside the pipe and must be removed. The shell segments are formed such that there are two opposed smaller segments and two opposed larger segments such that the smaller segments are removed one at a time thus allowing the larger segments to be removed.

A primary object of the invention is to form a bell in the end of a plastic pipe which will receive a resilient annular seal disposed in an annular groove formed in the bell for sealing about the plain end of a pipe inserted thereinto to thereby eliminate the necessity of using a separate coupling.

A still further object of the invention is to utilize a method which forms a bell in the end of a plastic pipe quickly and efficiently, forming distinct shoulders to form an annular groove in the end of the pipe to accept a resilient seal for forming a seal with the end of a pipe inserted therein.

A still further object of the method is to utilize a separable shell type mandrel which does not utilize moving parts to reduce the wear and time required to position the molding shell into place.

Other and further objects of the invention will become apparent upon referring to the detailed description hereinafter following and by referring to the drawings annexed hereto.

DESCRIPTION OF THE DRAWINGS

Drawings of a preferred embodiment of the invention are annexed hereto so that the invention may be better and more fully understood, in which:

FIG. 4 is a cross-sectional elevational view of the mandrel which is enlarged to more clearly illustrate the details of construction;

FIG. 5 is an elevational view of the mandrel with a plastic pipe inserted thereover with parts broken away to more clearly illustrate the details of construction;

FIG. 6 is a sectional elevational view similar to that in FIG. 5 showing the cooling step of the method; and FIG. 7 is a side elevational view of the mandrel and pipe with the mandrel core withdrawn from the mandrel shell.

Like numerals have been used to designate parts of the devices shown in the drawings and like parts are designated by like numerals throughout the various figures of the drawings.

DESCRIPTION OF A PREFERRED EMBODIMENT

Figure 1:
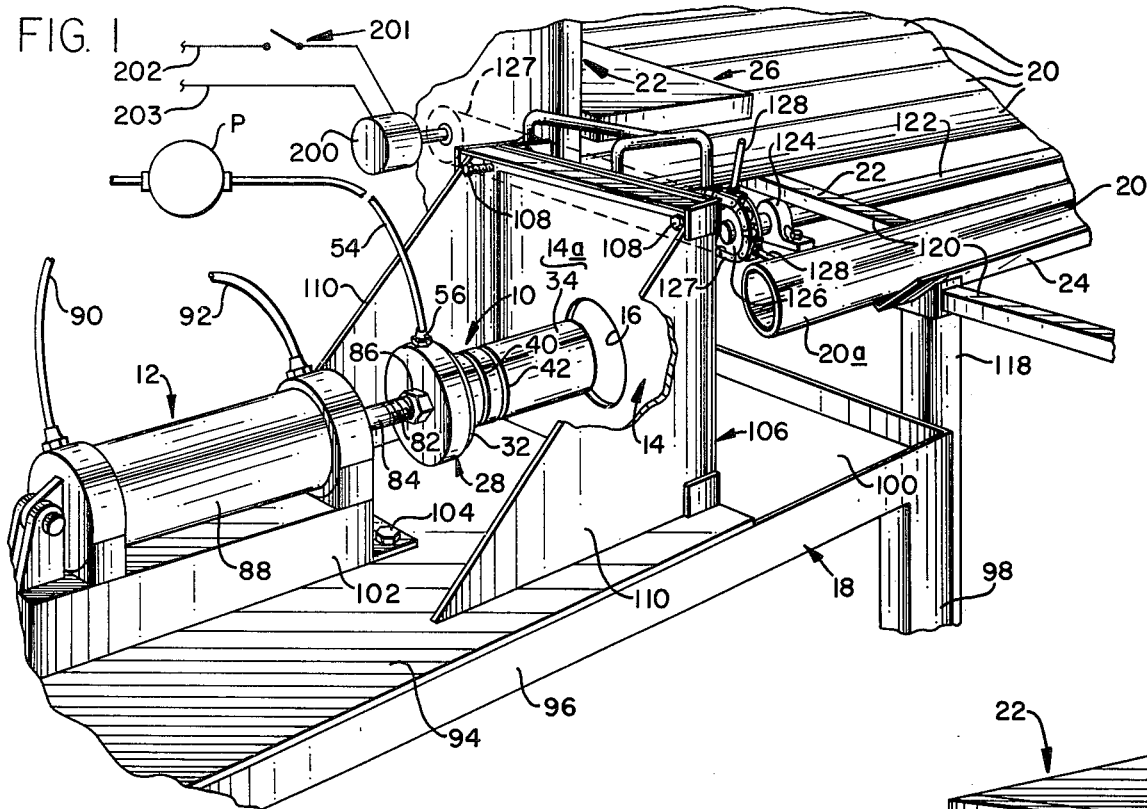
FIG. 1 is a rear perspective view showing the left side of the belling apparatus with the mandrel core withdrawn from the stripper plate, with parts broken away to more clearly illustrate the details of construction.
Figure 2:
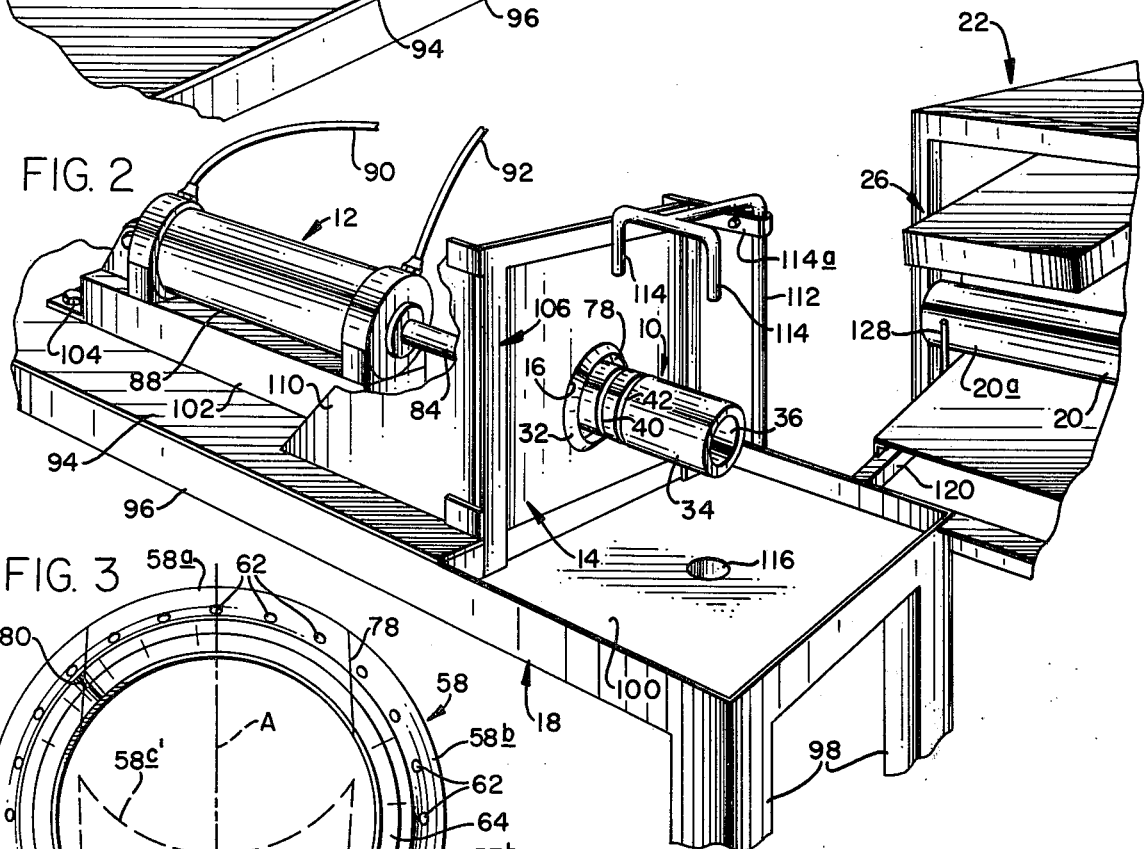
FIG. 2 is a front perspective view showing the left side of the belling apparatus with a mandrel core positioned through the stripper plate with parts broken away to more clearly illustrate the details of construction.

Referring to FIGS. 1 and 2 of the drawings, the apparatus generally comprises a mandrel generally designated by the numeral 10 which is secured to an actuating means 12 which moves the mandrel 10 from the position shown in FIG. 1 behind the stripper plate 14 through apertures 16 in the stripper plate to the position shown in FIG. 2. Support means 18 is provided to support the mandrel 10 and actuating means 12 in aligned position with the pipes 20.

Pipes 20 are of the plastic type generally extruded in predetermined lengths and of varying diameters and are generally constructed of materials such as polyvinyl chloride (PVC) and other standard plastics. The pipes 20 are generally aligned on a pipe support means 22 which releases the pipe one at a time to fall into pipe guide 24 which aligns the axis of the pipe 20 and and the axis of the mandrel 10. The ends 20a of the pipe 20 are heated by heater means 26 to a temperature range between 250 and 400 degrees Fahrenheit such that the pipe 20 is sufficiently soft to expand when subjected to relatively low pressures and be conformed to a desired surface configuration.

Referring to FIGS. 4–7, mandrel 10 generally comprises a mandrel base 28 which is generally cylindrical in shape having an abuttment shoulder 30 adapted to engage the back surface 14a of stripper plate 14 to limit forward longitudinal movement of the base 28. Adjacent shoulder 30 is a tapered shoulder 32 formed radially inwardly to form a tapered surface for abutting the end 20a of pipes 20 as will be more fully explained hereinafter. A mandrel core 34 having a hollow bore 36 is threadedly secured to a threaded lug 38 formed on the interior side of base 28.

Mandrel core 34 has a pair of spaced annular grooves 40 and 42 formed about the periphery thereof adjacent base 28. Grooves 40 and 42 are spaced apart and communicate with passage 44 by means of apertures 46 and 48. Passage 44 communicates with an annular passage 50 which abuts end 34a of mandrel core 34 and communicates with a passage 52 formed in the mandrel base 28. A vacuum source such as pump P, diagrammatically illustrated in FIG. 1, is connected to line 54. Line 54 communicates with passage 52 through fitting 56 such that a vacuum may be drawn through passage 52, through passage 44, through apertures 46 and 48 in annular grooves 40 and 42. Line 54 should be flexible to allow for movement of mandrel base 28.

The mandrel shell 58 comprises four separable segments 58a, 58b, 58c and 58d and forms the molding means which is slideably disposed over the mandrel core 34 for forming the end 20a of the pipe 20. A plurality of apertures 60 and 62 are formed about the periphery of segments 58a–58d in an aligned relationship with annular grooves 40 and 42 such that a vacuum may be drawn through apertures 60 and 62 for purposes hereinafter to be explained.

The mandrel shell 58 has a first tapered shoulder 64 adjacent end 57b adapted to align the end 20a of pipe 20 such that it slides onto the mandrel shell 58 and first parallel section 66 which has an effective diameter of the interior diameter of the pipe 20. A second shoulder 68 is formed approximately one fourth of the distance between end 57b and 57a of shell 58 to expand the pipe 20 such that the inside diameter of the bell in pipe 20 will be equal to the outside diameter of end 20b of the pipe 20. It should be readily apparent that end 20b of another pipe 20 may be slipped into end 20a of the pipe 20 as the pipes 20 are successively fed thereto.

An annular expanding shoulder 70 is formed by an upwardly rounded shoulder 72 and a downwardly tapered shoulder 74 such that the end 20a of the pipe 20 slides over the annular expander shoulder 70 as it is expanded. The end 20a of the pipe is expanded against and engages the tapered shoulder 32 on base 28 to form a partial seal therewith as it is deflected outwardly. As best iIllustrated in FIG. 5, end 20a of pipe 20 is pushed until it engages stripper plate 14. It should be readily apparent from FIG. 5 that pipe 20 does not conform to the surface of the mandrel shell 58 over the annular expander shoulder 70. Therefore, it is necessary for the end 20a of the pipe 20 while it is still soft and pliable to draw a vacuum through line 54, passage 52, passage 44, apertures 46 and 48, grooves 40 and 42, and apertures 60 and 62 on the cavity 76 formed about the annular expander shoulder 70. The vacuum draws the soft, pliable wall of the pipe 20 against the wall of the mandrel shell 58, as best illustrated in FIG. 6.

End 57a of mandrel shell 58 is slideably disposed in an annular recess 78 formed by the interior side of tapered shoulder 32. Recess 78 should be slightly tapered inwardly toward the rear 28a of base 28 to allow for smooth insertion of the end 57a of mandrel shell 58.

Figure 3:
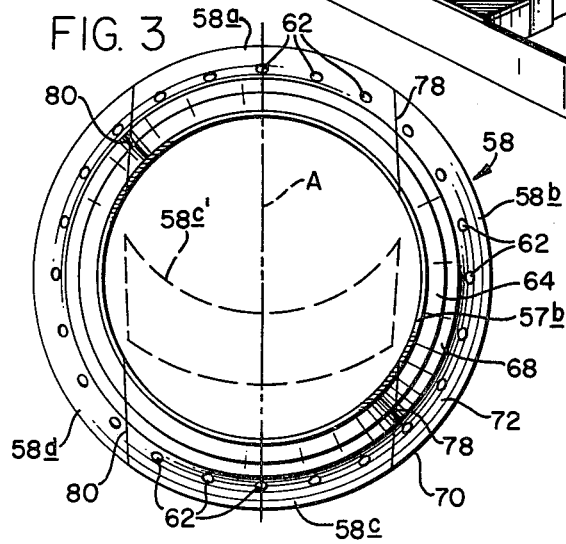
FIG. 3 is an end elevational view of the mandrel shell disconnected from the belling apparatus.

As best illustrated in FIG. 3, mandrel shell 58 is comprised of four interfitting segments 58a–58d. Segments are arranged such that segments 58a and 58c are smaller in size than segments 58b and 58d. Smaller segments 58a and 58c are formed such that the sides 78 and 80 of each segment are formed inwardly at a small angle, such as 3 degrees, relative to and substantially parallel to a plane A passing through the longitudinal axis of the mandrel shell 58 and the center of each segment 58a and 58c. Each smaller segment comprises approximately a 70 degree arc of the total mandrel shell 58. It should be readily apparent that this allows easy removal of the segments one at a time after they have been inserted into the end 20a of pipe 20. As shown in dashed outline 58c', segment 58c is removed by moving same inwardly then sliding the segment 58c out of the end 20a of the pipe 20. Larger segments 58b and 58d comprise approximately 110 degrees of the total arc of mandrel shell 58 and after segments 58c and 58a have been removed they may be easily removed toward the center and pulled out of the end of the pipe 20.

The mandrel shell 58 may be constructed of various materials such as a ferrous or non-ferrous metal or a fluorocarbon such as sold under the trademark Teflon ® or may be a combination of these materials.

It should be readily apparent from the foregoing that second tapered shoulder 68 forms a seal with the expanded wall of end 20a of pipe 20 such that the cavity 76 is formed between the seal of the end 20a and tapered shoulder 32 and the seal end formed by second shoulder 68.

It should further be appreciated that various surface configurations may be formed depending upon the desired surface configuration of the bell end of the pipe.

Annular expander shoulder 70 forms an annular groove 80 in end 20a of pipe 20 which may receive a resilient sealing ring (not shown) for sealing with the plane end 20b of another pipe 20.

The mandrel base 28 is attached to the threaded end 82 of shaft 84. A lock nut 86 provides a tight connection to prevent rotation of base 28 on shaft 84.

Shaft 84 is secured to actuating means 12 which generally comprises a cylinder such as hydraulic cylinder 88 having a piston (not shown) connected to the shaft 84 such that the piston is reciprocated between the ends of cylinder 88, moving shaft 84 into and out of cylinder 88 thereby moving mandrel 10 into and out of aperture 16 in stripper plate 14. Valve means (not shown), well known in the art is provided to actuate the cylinder 88 to move the shaft 84.

A line 90 is connected to the rear end of hydraulic cylinder 88 and a line 92 is connected to the front end of cylinder 88 such that when pressure is applied to the line 90 and line 92 is vented the piston (not shown) is moved forward thus extending shaft 84 outwardly to push the mandrel 10 through aperture 16 and into engagement with the end 20a of pipe 20 thus performing the first step in molding the pipe 20. When pressure is applied to line 92 and line 90 is vented, shaft 84 is retracted thus removing the mandrel 10 and pulling mandrel core 34 and mandrel base 28 from the end 20a of pipe 20, but leaving segmented mandrel shell within the end 20a of pipe 20.

Support means 18 generally comprises a table 94 secured by welding or other means to cross members 96 and legs 98. A tray 100 is formed in the front end of support means 18 adjacent stripper plate 14. The actuating means 12 is bolted to a support base 102. Base 102 is secured by bolts 104 to top 94. An upwardly extending frame 106 is formed to mount stripper plate 14. Stripper plate 14 is slideably disposed in frame 106 such that it may be removed easily therefrom for inserting plates 14 with larger apertures 16. Locking screws 108 are threadly secured to frame 106 to engage the surface 14a of stripper plate 14 and rigidly secure the stripper plate 14 in frame 106. Angular braces 110 are formed on each side of frame 106 to retain the stripper plate 14 in perpendicular relationship to the longitudinal axis of mandrel 10.

Means to cool the end 20a of pipe 20 comprises a conduit 112 extending upwardly through bracket 114a, secured to one side of frame 106, and having a pair of downwardly deflected spouts 114 aligned over the end 20a of the pipe 20. After pipe 20 is formed onto mandrel 10 cool water is sprayed over the exterior of end 20a of pipe 20 to harden same. Water flows into the trough 100 and drain 116 where it is disposed of through the normal drainage system (not shown).

Pipe support means 22 generally comprises upwardly extending legs 118 secured to transverse members 120 which forms a tapered rolling surface for the pipes 20. Means to release the pipe generally comprises a shaft 122 journalled through pillow blocks 124 secured to lower transverse member 120. A gear 126 is drivingly connected by a chain 127 to drive motor 200. Motor 200 is actuated by a switch 201 connected in series with line 202 connected to a power source. Line 203 grounds motor 200. The chain 127 has upwardly extending splines 128 which extend between the pipes 20 as they are placed on the pipe support means 22. The pipes 20 are released one at a time such that a pipe 20 rolls into slanted guide 24. This is a standard process well known in the art and further explanation is not deemed necessary. Ends 20a are positioned below heater means 26 which may be a radiant type heater such as an electrical strip heater or the like which heats the ends to a desired temperature to soften same prior to forming the bell.

Operation of the hereinbefore described device is as follows:

Pipes 20 are aligned on the pipe support means 22 such that ends 20a are heated under heater means 26 for a predetermined period of time thus heating the ends 20a of pipes 20 to a temperature between 250 and 400 degree Fahrenheit. This softens the wall of the pipes 20 making them pliable on the ends 20a for the belling process.

Gear 126 is rotated to move splines 128 on chain 127 to release a single pipe 20 to roll down guide 120 into pipe guide 24. Pipe 20 is thus aligned with the longitudinal axis of mandrel 10.

Cylinder 88 is then actuated to pressurize line 90 and line 92 thus extending rod 84 and moving mandrel 10 through aperture 16 and stripper plate 14. The four segments 58a-58d of mandrel shell 58 are positioned on mandrel core 34 such that ends 57a of the mandrel shell 58 are slideably disposed in recess 78 on mandrel base 28.

End 20a of pipe 20 is then moved forward to engage tapered edge 64 on mandrel shell 58 which aligns pipe 20 with mandrel 10. Pipe 20 is further urged over the mandrel 10 and pipe 20 is expanded by shoulder 68 and moved over rounded shoulder 72 of annular expander shoulder 70 and into contact with tapered shoulder 32 of mandrel base 28. The end 20a of pipe 20 is flared outwardly, as best illustrated in FIG. 5, thus forming a partial seal with mandrel base 28. Shoulder 68 forms a seal on the opposite side of annular expander shoulder 70 to form a seal on the second end of end 20a of pipe 20 thus forming a cavity 76 about annular expander shoulder 70.

A vacuum is then drawn through line 54 to passage 52, to passage 44, apertures 46 and 48, grooves 40 and 42 and apertures 60 and 62 in mandrel shells 68 communicating with cavity 76. The soft, pliable end 20a is drawn by the vacuum against the mandrel shell 58. Reduced pressure in cavity 76 and the air pressure on the exterior of pipe 20 forces the pipe wall against the exterior configuration of annular expander shoulder 70 on mandrel shell 58.

After the vacuum has pulled the pipe wall of pipe 20 down against the exterior shell 58, cooling water or other liquid is sprayed from spouts 114 onto the exterior of end 20a of pipe 20. Water drains through drain 116 into the sewage system or the like. After the pipe 20 has been cooled to room temperature, line 92 is pressurized and line 90 is vented on cylinder 88 retracting rod 84 into the cylinder 88 and pulling mandrel core 34 and mandrel base 28 outwardly from aperture 16 and stripper plate 14 away from mandrel shell 58. Longitudinal movement of mandrel shell 58 is limited by the tapered shoulder 74 on annular expander shoulder 70.

As best illustrated in FIG. 7, mandrel shell 78 is left within the end 20a of pipe 20. The end of pipe 20 abutts stripper plate 14 to limit longitudinal movement of pipe 20 as the mandrel core 34 and mandrel base 28 are withdrawn.

Pipe 20 is then withdrawn for access to end 20a. Segment 58a of mandrel shell 58 is then moved toward the center of pipe 20 for removal of same as shown in dashed outline 58a' in FIG. 7. Segment 58c is moved toward the center line, as illustrated in FIG. 3 in dashed outline 58c', for removal of same. This leaves room to remove segments 58b and 58d by moving them away from the inner wall of pipe 20 and removing them one at a time. The segments 58a-58d are then repositioned on the mandrel core 34 in recess 78 for belling the next pipe.

From the foregoing it should be readily apparent that the embodiment hereinbefore described accomplishes the objects of the invention hereinbefore discussed.

It should be appreciated that other and further embodiments of the invention may be devised without departing from the basic concept thereof.

Having described my invention, I claim:

1. A method of forming a bell in the end of a plastic pipe comprising the steps of: heating the end of the plastic pipe to be formed; positioning a segmented mandrel shell having an outside diameter larger than the outside diameter of the plastic pipe over a mandrel core, said segmented mandrel shell having a first tapered shoulder adjacent a first end, a second tapered shoulder adjacent a second end, and an enlarged annular ridge formed between said first and second tapered shoulders; urging the heated end of the pipe over the segmented mandrel shell to move the end of the pipe past the first tapered shoulder to form a bell portion in the end of the pipe such that the inside diameter of the bell portion is substantially equal to the outside diameter of the pipe; urging the heated end of the pipe over the enlarged annular ridge to expand the end of the pipe; urging the end of the pipe into engagement with the second tapered shoulder to form a partial seal by further expanding the end of the pipe to form a cavity between the first and second tapered shoulders and around the annular ridge; drawing a vacuum through the segmented mandrel shell between the first and second tapered shoulders to evacuate air from the cavity on opposite sides of the enlarged annular ridge such that the interior wall of the plastic pipe is drawn against the surface of the segmented mandrel shell; cooling the end of the pipe; withdrawing the mandrel core from the plastic pipe with the segmented mandrel shell so that the mandrel core and mandrel shell may be separated; removing each segment of the segmented mandrel shell from the end of the plastic pipe by moving the segments toward the center of the pipe and withdrawing the segments one at a time.

2. The method called for in claim 1 wherein the pipes are heated to a temperature between 250 to 400 degress Fahrenheit to sufficiently soften the pipe to allow expansion thereof at low pressures.

3. A method of forming a bell in the end of a plastic pipe wherein the bell is formed around a segmented mandrel shell, comprising the steps of: positioning a mandrel core and mandrel base having a tapered shoulder through an aperture formed in a stripper plate, the aperture having a diameter which is less than the outside diameter of the end of a pipe positioned over the tapered shoulder; installing each of four shell segments on the mandrel core, said segments having an enlarged annular ridge formed thereon and a tapered shoulder adjacent the outer end of the shell segments adapted to flare the pipe to form a seal between the shell segments and a pipe; wedging the inner ends of the shell segments in an annular groove formed in the mandrel base to form a mandrel shell; heating the end of the plastic pipe until the pipe becomes soft and pliable; urging the heated end of the pipe over the mandrel shell to expand the pipe outwardly; pushing the end of the pipe past the enlarged annular ridge into engagement with the tapered shoulder on the mandrel base such that the end of the pipe is flared substantially outwardly into sealing relation with the tapered shoulder on the mandrel base and positioned adjacent the stripper plate; drawing a vacuum through passages adjacent opposite sides of the annular ridge to draw the interior wall of the pipe against the mandrel shell; cooling the end of the plastic pipe; withdrawing the mandrel core and base from the mandrel shell while movement of the pipe is restrained by the stripper plate; removing the shell segments one at a time by moving each segment to the center of the pipe and withdrawing the segment.

* * * * *